(12) United States Patent
Kohshima

(10) Patent No.: US 11,545,798 B2
(45) Date of Patent: Jan. 3, 2023

(54) POWER SUPPLY RAIL SYSTEM

(71) Applicant: One by One Co., Ltd., Higashi-Osaka (JP)

(72) Inventor: Kuniharu Kohshima, Higashi-Osaka (JP)

(73) Assignee: ONE BY ONE CO., LTD., Osaka (JP)

( * ) Notice: Subject to any disclaimer, the term of this patent is extended or adjusted under 35 U.S.C. 154(b) by 107 days.

(21) Appl. No.: 17/171,156

(22) Filed: Feb. 9, 2021

(65) Prior Publication Data

US 2022/0006249 A1 Jan. 6, 2022

(30) Foreign Application Priority Data

Jul. 3, 2020 (JP) .............................. JP2020-115291

(51) Int. Cl.

| | | |
|---|---|---|
| *H01R 25/00* | (2006.01) | |
| *H01R 25/14* | (2006.01) | |
| *H01R 31/06* | (2006.01) | |
| *H01R 13/639* | (2006.01) | |
| *H02G 5/02* | (2006.01) | |
| *H01R 13/02* | (2006.01) | |

(52) U.S. Cl.
CPC .......... *H01R 25/142* (2013.01); *H01R 13/02* (2013.01); *H01R 13/639* (2013.01); *H01R 25/145* (2013.01); *H01R 31/06* (2013.01); *H02G 5/02* (2013.01)

(58) Field of Classification Search
CPC .... H01R 9/2608; H01R 9/2691; H01R 25/14; H01R 25/142; H01R 25/145; H01R 25/16; H01R 13/02; H01R 13/639; H01R 31/06; H02G 5/02
See application file for complete search history.

(56) References Cited

U.S. PATENT DOCUMENTS

| | | | | |
|---|---|---|---|---|
| 3,848,715 | A | * | 11/1974 | Hesse ................... H01R 25/142 439/119 |
| 3,963,294 | A | * | 6/1976 | Heritage ................ F21V 21/02 439/121 |
| 4,790,766 | A | * | 12/1988 | Booty, Sr. ............ H01R 25/142 439/122 |
| 4,822,292 | A | * | 4/1989 | Thayer ................ H01R 25/142 439/115 |

(Continued)

FOREIGN PATENT DOCUMENTS

JP 2016081843 A 5/2016

*Primary Examiner* — Thanh Tam T Le
(74) *Attorney, Agent, or Firm* — Buchanan Ingersoll & Rooney PC

(57) ABSTRACT

A power supply rail includes a groove extending in a first direction in a base portion and having an opening on a one-end side in a second direction, a conductive portion provided at a bottom surface of the groove, and a first recess formed on a first side wall of the groove. A power supply terminal is attachable/detachable into/from the groove, and includes terminal portions formed on an other-end side in the second direction of a body portion, a lead-wire portion from the terminal portions and elastic portions provided on a first side surface of the body portion. The elastic portions are latched in contact with an inside of the first recess of the power supply rail, and the terminal portions contact with the conductive portion.

20 Claims, 12 Drawing Sheets

(56) References Cited

U.S. PATENT DOCUMENTS

| | | | | | |
|---|---|---|---|---|---|
| 5,151,038 | A | * | 9/1992 | Range | H01R 25/142 439/122 |
| 5,334,037 | A | * | 8/1994 | Gabrius | H01R 25/142 439/118 |
| 6,056,561 | A | * | 5/2000 | Lin | H01R 25/142 439/121 |
| 6,059,582 | A | * | 5/2000 | Tsai | H01R 25/147 439/121 |
| 7,256,346 | B2 | * | 8/2007 | Walter | H01R 25/14 52/36.6 |
| 7,744,386 | B1 | * | 6/2010 | Speidel | H01R 25/145 439/118 |
| 8,485,835 | B2 | * | 7/2013 | Liang | E04B 9/244 52/220.6 |
| 10,135,209 | B1 | * | 11/2018 | Wynnik | H01R 25/162 |
| 10,492,631 | B2 | * | 12/2019 | Velderman | H05K 7/1457 |
| 11,223,175 | B2 | * | 1/2022 | Terumichi | H01R 25/142 |

* cited by examiner

POWER SUPPLY RAIL SYSTEM

BACKGROUND OF THE INVENTION

1. Field of the Invention

The present disclosure relates to a power supply rail system.

2. Description of the Background Art

A conventional power supply rail system includes a power supply rail and a light emitting module attached to the power supply rail. The power supply rail includes an insulating base material, a groove formed in the base material so as to extend in a first direction and to be formed in the base material in the first direction, and a conductive member embedded in the groove in the first direction and electrically connected to a terminal of the light emitting module. The conductive member can partially protrude outward of one end of the groove. When a part of the conductive member protrudes outward of the one end of the groove, the conductive member of another power supply rail can be inserted to the other end of the groove.
Patent Document 1: Japanese Laid-Open Patent Publication No. 2016-81843

In the conventional power supply rail system, a projection-shaped terminal of the light emitting module is inserted into a recess of the power supply rail so as to contact therewith, thereby making electric connection. Therefore, although attachment and detachment are easy, there is a problem that electric connection might be unstable.

SUMMARY OF THE INVENTION

The present disclosure has been made to solve the above problem, and an object of the present disclosure is to provide a power supply rail system that allows attachment and detachment to be easily performed and stabilizes electric connection.

A power supply rail system according to the present disclosure includes a power supply rail and a power supply terminal attachable/detachable to/from the power supply rail.

The power supply rail includes an insulating base portion, a groove formed so as to extend in a first direction in the base portion and to have an opening on a one-end side in a second direction perpendicular to the first direction, a conductive portion to be electrically connected to an outside, the conductive portion being provided at a bottom surface on an other-end side in the second direction of the groove, and a first recess provided on a first side wall which is one of side walls of the groove so as to extend in the first direction and to be depressed in a third direction perpendicular to the first direction and the second direction.

The power supply terminal is attachable/detachable into/from the groove of the power supply rail, and includes a body portion to be inserted into the groove of the power supply rail, a terminal portion to be electrically connected to the conductive portion, the terminal portion being formed on the other-end side in the second direction of the body portion, a lead-wire portion electrically connected to the terminal portion and led to the one-end side in the second direction of the body portion, and an elastic portion provided on a first side surface of the body portion on a side opposed to the first side wall of the groove, the elastic portion having elastic force in the third direction.

When the power supply terminal is inserted such that the first side surface of the power supply terminal is opposed to the first side wall of the groove, the elastic portion of the power supply terminal is latched in contact with an inside of the first recess of the power supply rail by the elastic force of the elastic portion, and the terminal portion of the power supply terminal comes into contact with the conductive portion of the power supply rail.

The power supply rail system according to the present disclosure allows attachment and detachment to be easily performed and can stabilize electric connection.

DETAILED DESCRIPTION OF THE PREFERRED EMBODIMENTS OF THE INVENTION

First Embodiment

Figure 1:
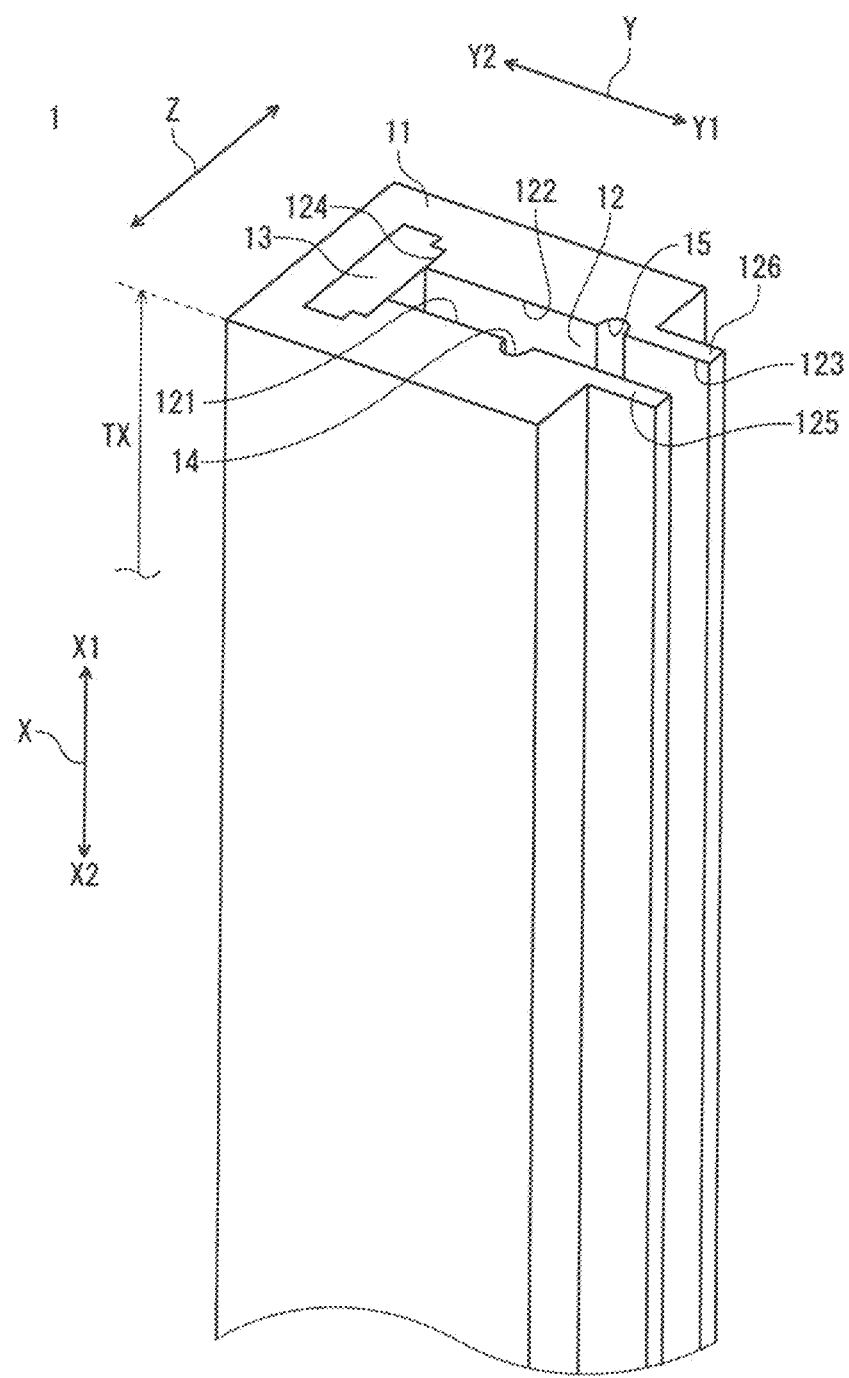
FIG. 1 is a perspective view showing a structure of a power supply rail of a power supply rail system according to the first embodiment of the present disclosure.
Figure 2:
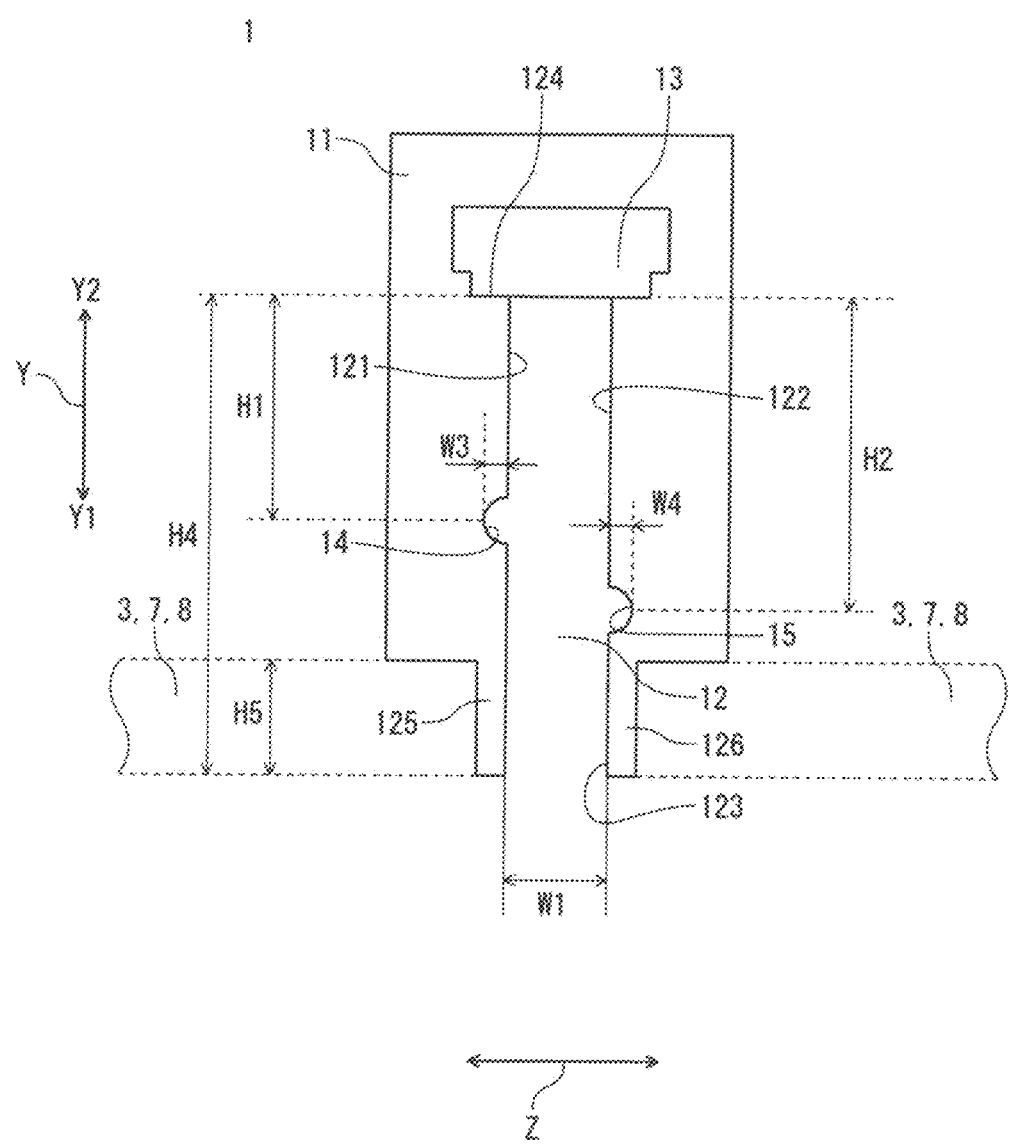
FIG. 2 is a plan view showing a structure of the power supply rail shown in FIG. 1.
Figure 3:
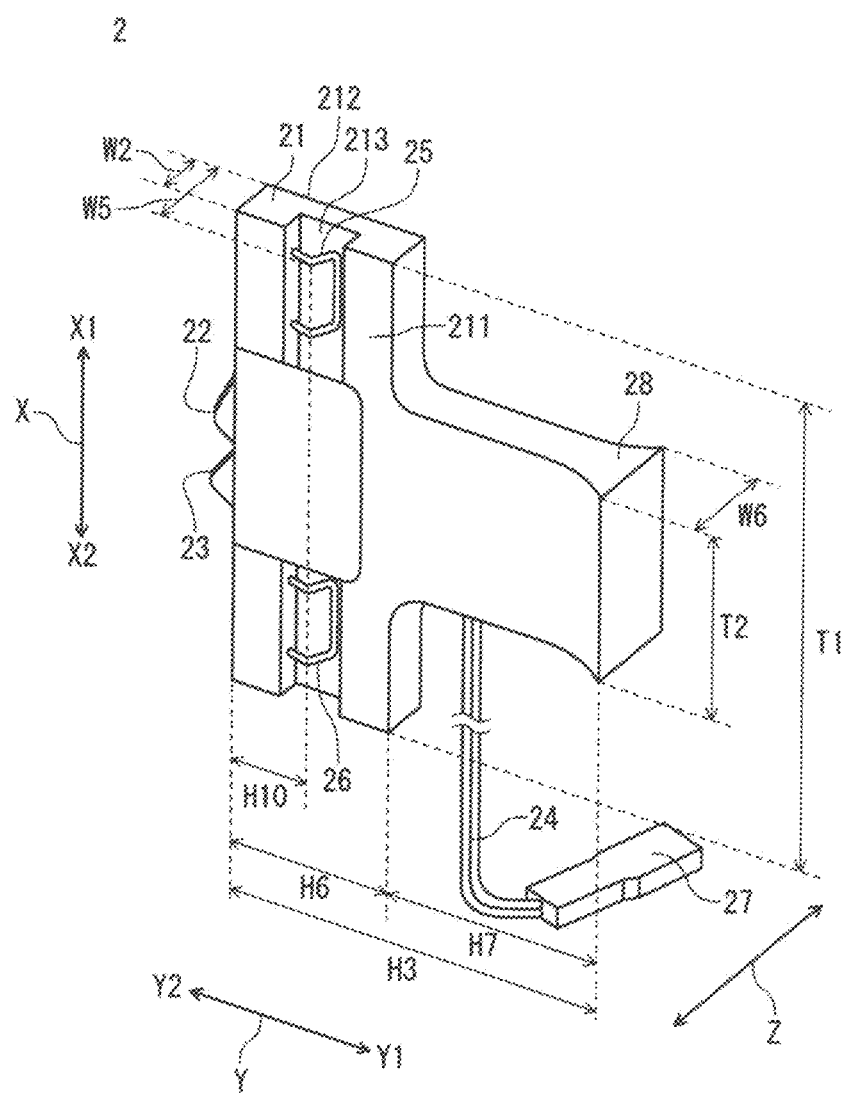
FIG. 3 is a perspective view showing a structure of a power supply terminal of the power supply rail system according to the first embodiment.
Figure 4:
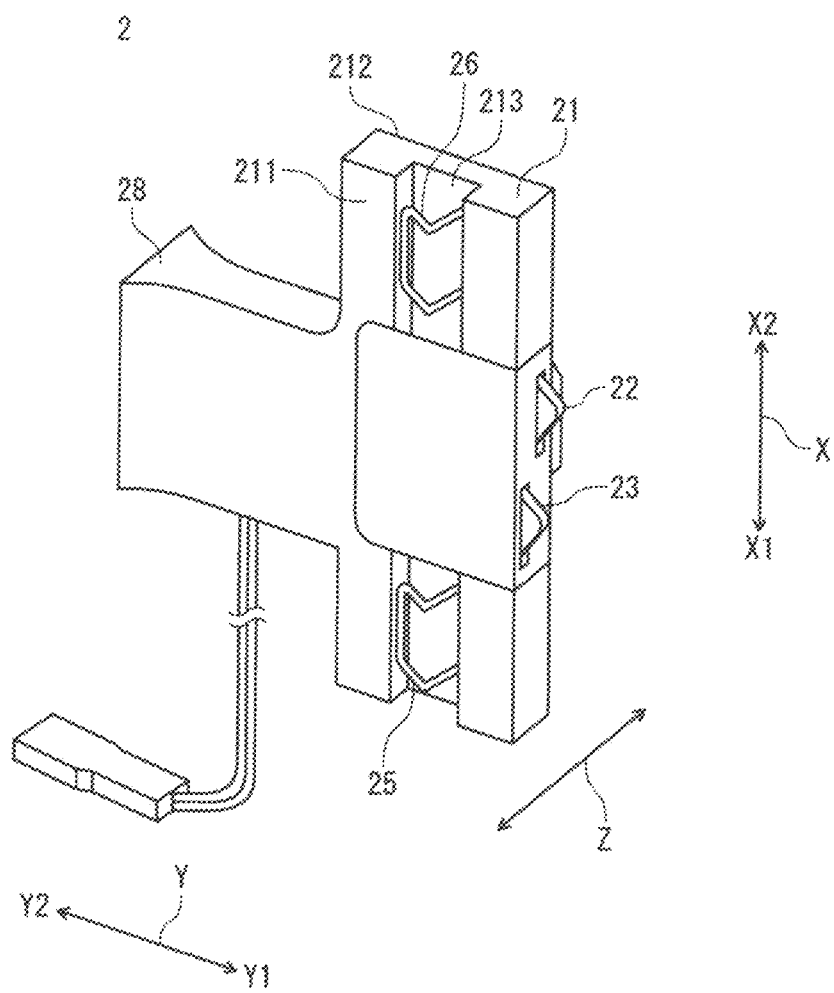
FIG. 4 is a perspective view of the power supply terminal shown in FIG. 3, as seen with a second direction reversed.
Figure 5:
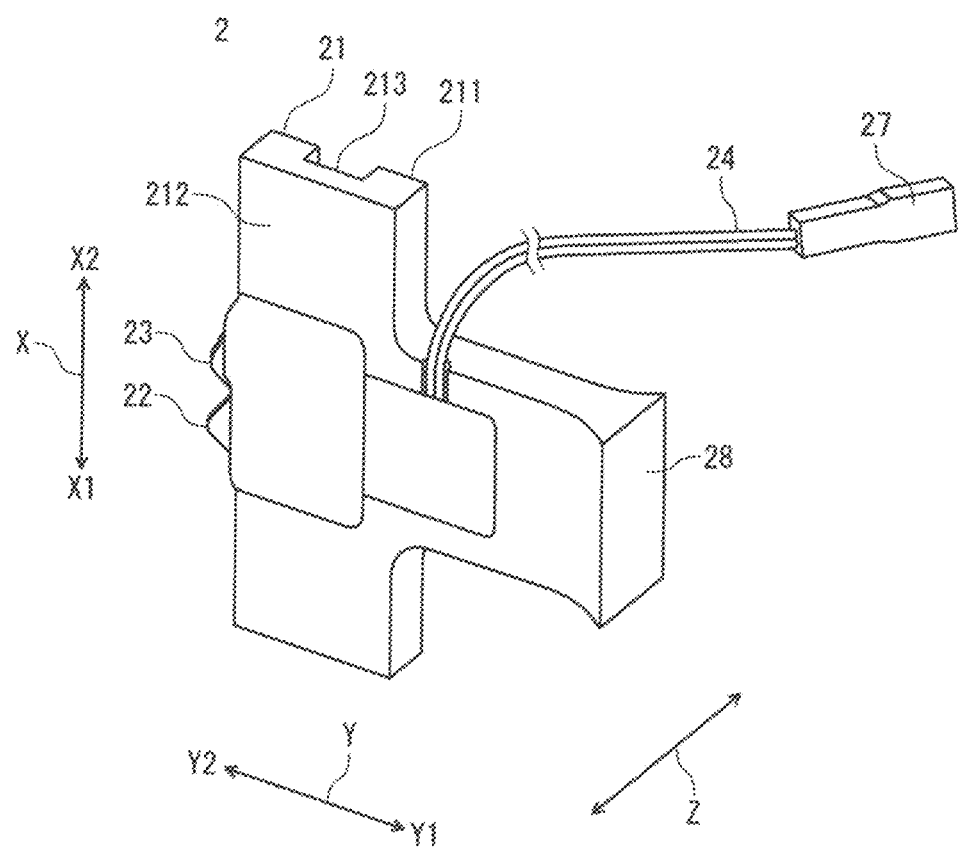
FIG. 5 is a perspective view of the power supply terminal shown in FIG. 3, as seen with a first direction reversed.
Figure 6:
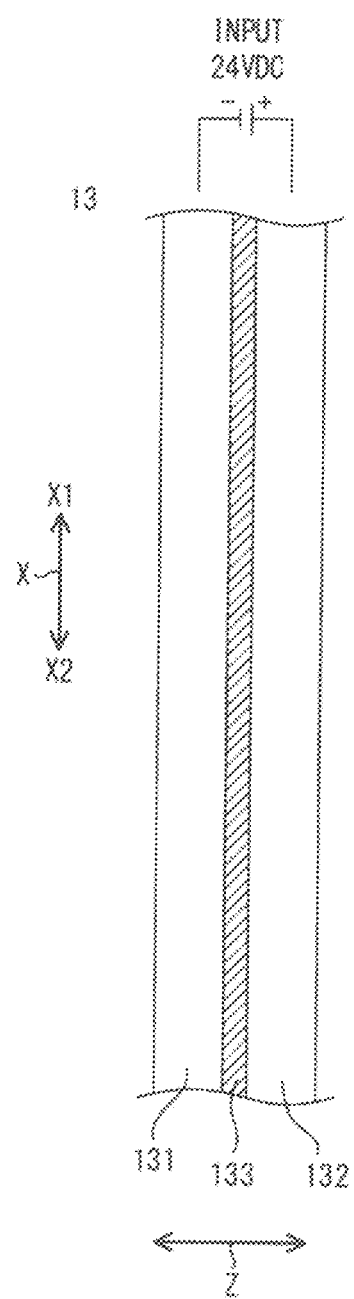
FIG. 6 is a schematic view showing a structure of a conductive portion in the power supply rail shown in FIG. 1.

FIG. 1 is a perspective view showing a structure of a power supply rail of a power supply rail system according to the first embodiment of the present disclosure. FIG. 2 is a plan view showing a structure of the power supply rail shown in FIG. 1. FIG. 3 is a perspective view showing a structure of a power supply terminal of the power supply rail system according to the first embodiment. FIG. 4 is a perspective view of the power supply terminal shown in FIG. 3, as seen with a second direction reversed. FIG. 5 is a perspective view of the power supply terminal shown in FIG. 3, as seen with a first direction reversed. FIG. 6 is a schematic view showing a structure of a conductive portion in the power supply rail shown in FIG. 1.

Figure 7:
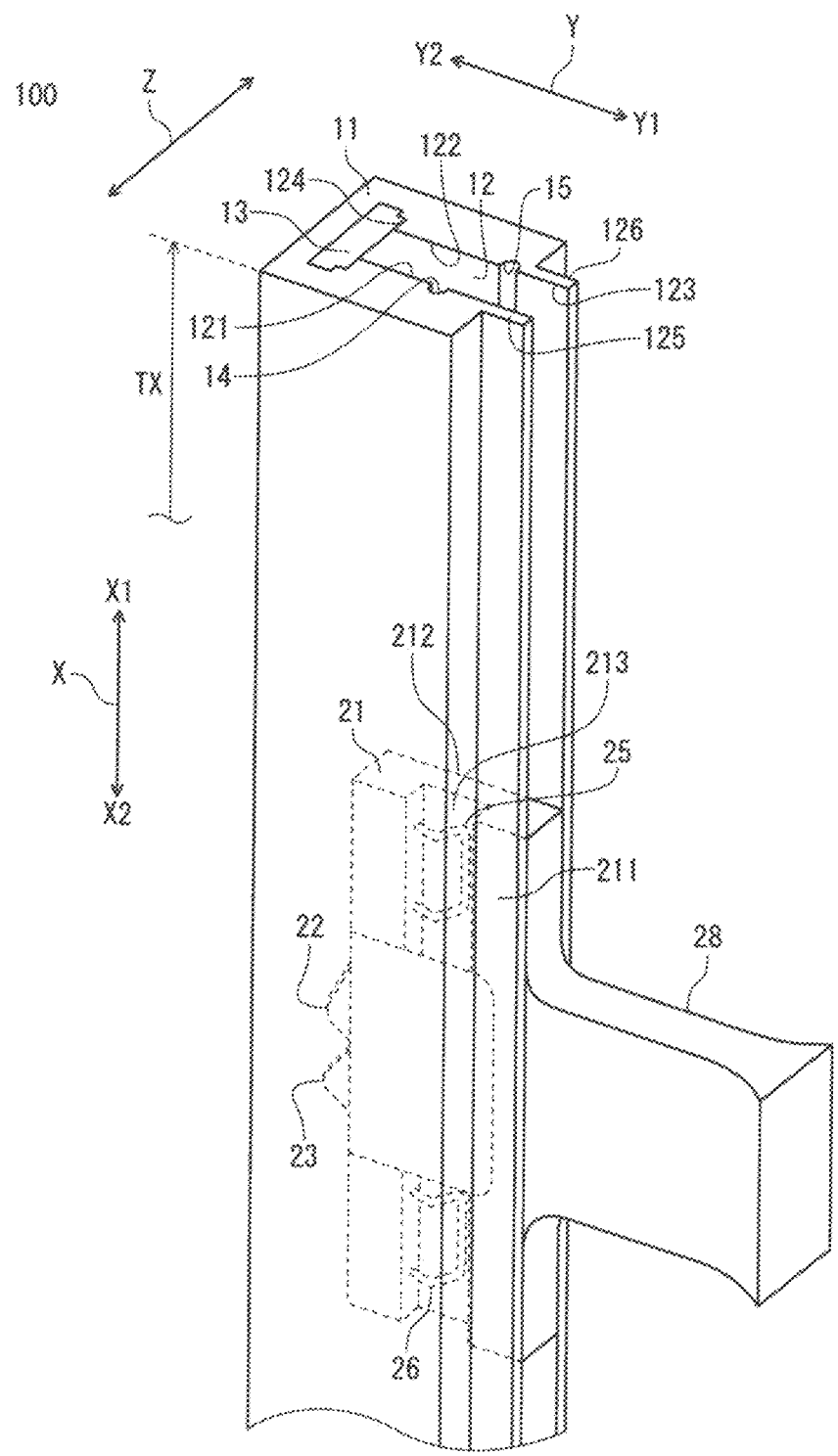
FIG. 7 is a perspective view showing the case where the power supply terminal in the state shown in FIG. 3 is inserted into the power supply rail shown in FIG. 1.
Figure 8:
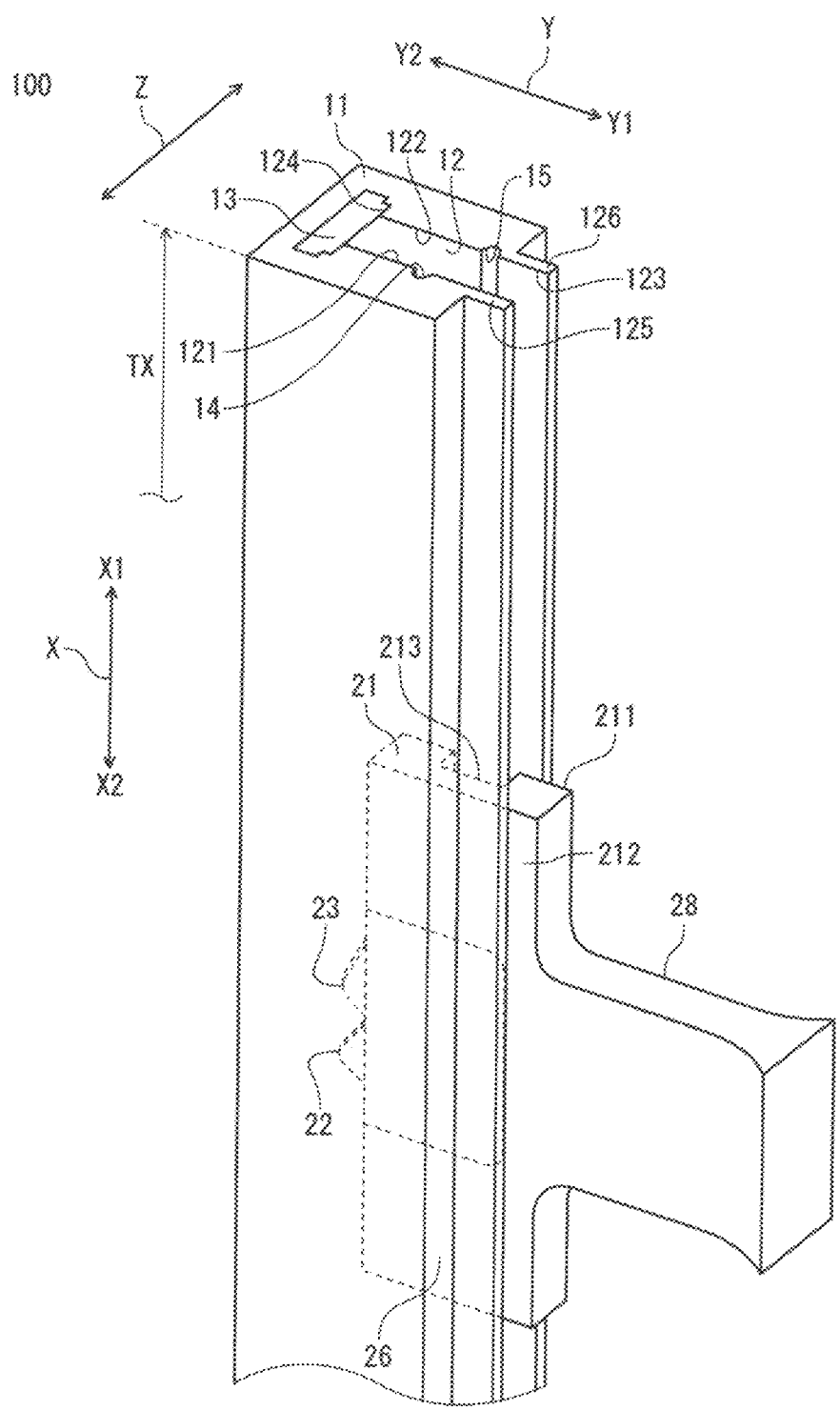
FIG. 8 is a perspective view showing the case where the power supply terminal in the state shown in FIG. 5 is inserted into the power supply rail shown in FIG. 1.
Figure 9:
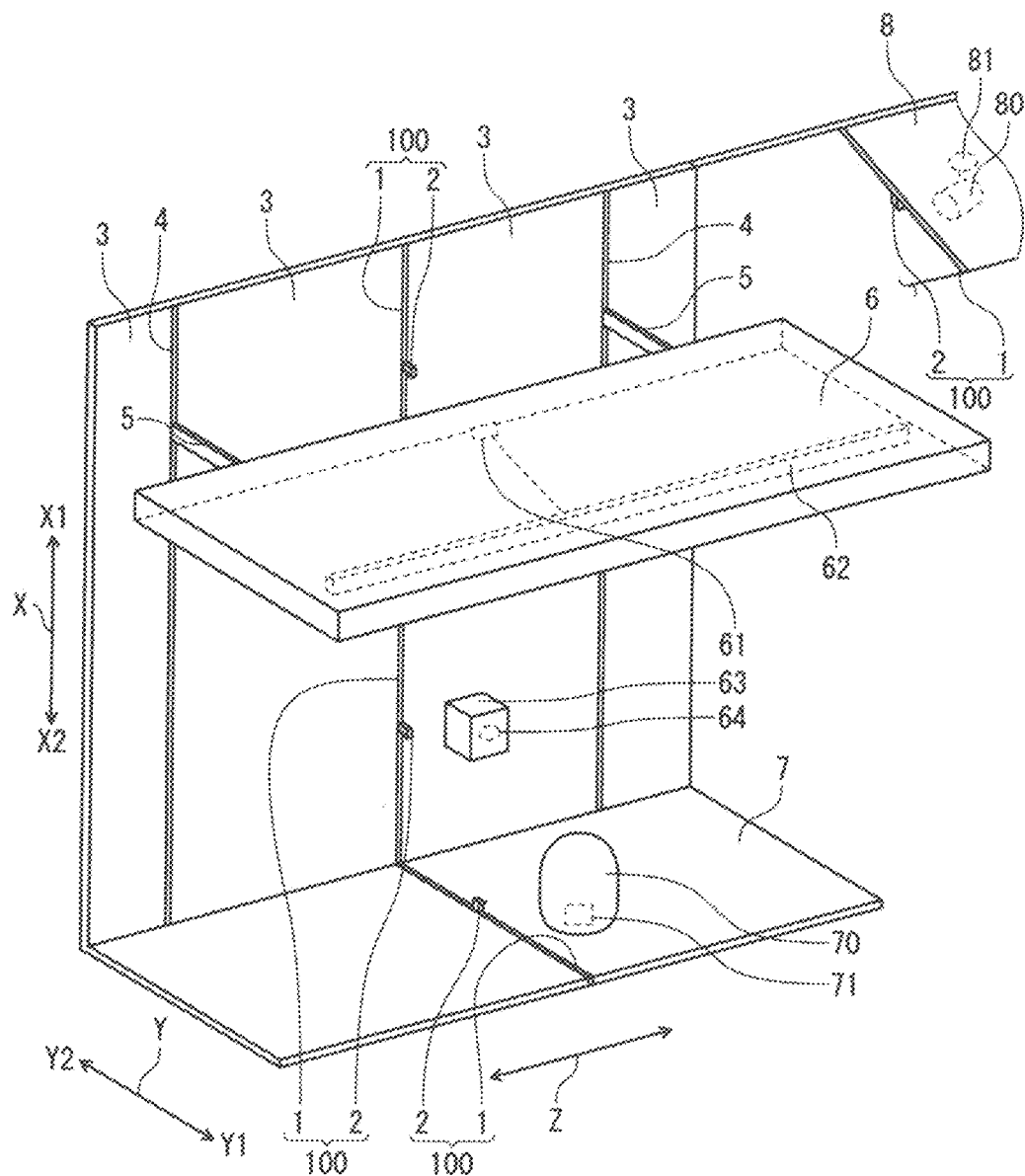
FIG. 9 is a perspective view showing an installation example of the power supply rail system using the power supply rail shown in FIG. 1 and the power supply terminal shown in FIG. 3.

FIG. 7 is a perspective view showing the case where the power supply terminal in the state shown in FIG. 3 is inserted into the power supply rail shown in FIG. 1. FIG. 8 is a perspective view showing the case where the power supply terminal in the state shown in FIG. 5 is inserted into the power supply rail shown in FIG. 1. FIG. 9 is a perspective view showing an installation example of the power supply rail system using the power supply rail shown in FIG. 1 and the power supply terminal shown in FIG. 3. In FIG. 7, FIG. 8, and FIG. 9, a lead-wire portion and a contact portion described later are not shown.

In the drawings, a power supply rail system 100 of the present disclosure includes a power supply rail 1 shown in FIG. 1 and a power supply terminal 2 shown in FIG. 3. The power supply terminal 2 is formed so as to be attachable/detachable to/from the power supply rail 1.

In FIG. 1, the power supply rail 1 includes an insulating base portion 11, a groove 12, a conductive portion 13, a first recess 14, and a second recess 15. As shown in the drawings, directions in the power supply rail system 100 are defined as a first direction X, a second direction Y, and a third direction Z. The first direction X is a longitudinal direction in which the base portion 11 extends. Here, a one-end side in the first direction X is referred to as X1, and an other-end side in the first direction X is referred to as X2. The second direction Y is a direction perpendicular to the first direction X. A one-end side in the second direction Y is referred to as Y1 and an other-end side in the second direction Y is referred to as Y2. The third direction Z is a direction perpendicular to the first direction X and the second direction Y. Also for the other parts, directions are indicated with reference to the above directions, to give a description.

The base portion 11 is formed by a rigid member, e.g., an aluminum member. The groove 12 extends in the first direction X of the base portion 11, and has an opening 123 on the one-end side Y1 in the second direction Y. The groove 12 has a bottom surface 124 on the other-end side Y2 in the second direction Y, and has a first side wall 121 which is one of side walls, and a second side wall 122 which is the other side wall. Brims 125, 126 are formed at the opening 123 of the groove 12. When the base portion 11 is mounted to a wall surface 3, a floor surface 7, a ceiling surface 8, or the like described later, the brims 125, 126 support the wall surface 3, the floor surface 7, the ceiling surface 8, or the like (see FIG. 2).

The conductive portion 13 is provided at the bottom surface 124 of the groove 12 and is electrically connected to the outside. For example, as shown in FIG. 6 which schematically shows only a conductive part of the conductive portion 13, the conductive portion 13 is connected to an external 24-VDC power supply, and includes conductive tapes 131, 132 extending in the first direction X and an insulating portion 133 provided between the conductive tapes 131, 132 in the third direction Z.

As shown in FIG. 2, the first recess 14 is formed on the first side wall 121 of the groove 12 so as to extend in the first direction X and to be depressed in a semicircular shape by about a depth W3 in the third direction Z. The second recess 15 is formed on the second side wall 122 of the groove 12 so as to extend in the first direction X and to be depressed in a semicircular shape by about a depth W4 in the third direction Z. The first recess 14 and the second recess 15 are formed in the same shape. The depression depth W3 of the first recess 14 is almost equal to the depression depth W4 of the second recess 15. The formation position of the second recess 15 is on the one-end side Y1 in the second direction Y of the groove 12 relative to the formation position of the first recess 14. A length H1 in the second direction Y from the bottom surface 124 of the groove 12 to the first recess 14 (the top of the semicircular shape) is smaller than a length H2 in the second direction Y from the bottom surface 124 of the groove 12 to the second recess 15 (the top of the semicircular shape).

Here, for facilitating the understanding of the configuration of the power supply rail system 100 of the present disclosure, a specific example of the sizes of the groove 12 of the base portion 11 and the like will be described below. A width W1 in the third direction Z of the opening 123 of the groove 12 is about 3.4 mm, for example. A length H4 in the second direction Y to the bottom surface 124 of the groove 12 is about 17 mm, for example. The length H1 for the first recess 14 is about 8 mm, for example. The length H2 for the second recess 15 is about 11 mm, for example.

The depth W3 of the first recess 14 and the depth W4 of the second recess 15 are about 1 mm, for example. That is, the first recess 14 and the second recess 15 are formed to be depressed in a semicircular shape with a radius of about 1 mm. A length H5 in the second direction Y of the brims 125, 126 is about 4 mm, for example. A length TX in the first direction X of the base portion 11 (groove 12) is set as appropriate in accordance with a length needed at the wall surface 3, the floor surface 7, or the ceiling surface 8 to which the power supply rail 1 is mounted.

Next, the power supply terminal 2 will be described. The power supply terminal 2 is attachable/detachable into/from the groove 12 of the power supply rail 1. As shown in FIG. 3 to FIG. 6, the power supply terminal 2 includes a body portion 21, terminal portions 22, 23, a lead-wire portion 24, elastic portions 25, 26, and a contact portion 27.

The body portion 21 is inserted into the groove 12 of the power supply rail 1. Therefore, a width W2 in the third direction Z of the body portion 21 is slightly smaller than the width W1 (see FIG. 2) of the groove 12 of the power supply rail 1 so as to allow attachment/detachment. The body portion 21 is formed by a rigid member, e.g., an aluminum member. One of the side surfaces along the first direction X of the body portion 21 is referred to as first side surface 211, and the other side surface is referred to as second side surface 212. The first side surface 211 is a side on which the elastic portions 25, 26 described later are formed. The second side surface 212 is a side on which the elastic portions 25, 26 are not formed, and is formed to be a flat surface.

A length H3 in the second direction Y of the body portion 21 is greater than the length H4 in the second direction Y of the groove 12 of the power supply rail 1. On the one-end side Y1 in the second direction Y of the body portion 21, a hold portion 28 is formed such that a width W6 in the third direction Z is greater than the width W1 in the third direction Z of the opening 123 of the groove 12. A length T1 in the first direction X of a part where the elastic portions 25, 26 are formed, in the body portion 21, is the maximum length T1 in the first direction X of the body portion 21. The length TX in the first direction X of the base portion 11, i.e., the groove 12, of the power supply rail 1 is greater than the length T1 in the first direction X of the body portion 21.

The terminal portions 22, 23 are formed on the other-end side Y2 in the second direction Y of the body portion 21, and are electrically connected to the conductive portion 13. One of the terminal portions 22, 23 is a plus side, and the other one is a minus side. The terminal portions 22, 23 are formed by, for example, spring electrodes having elastic force in the second direction Y. The lead-wire portion 24 is electrically connected to the terminal portions 22, 23 and led to the one-end side Y1 in the second direction Y of the body portion 21.

The elastic portions 25, 26 are provided at a depressed portion 213 formed so as to extend in the first direction X on the first side surface 211 of the body portion 21 on the side opposed to the first side wall 121 of the groove 12. Further, the elastic portions 25, 26 have elastic force in the third direction Z. A length H10 from the top in the third direction Z of each elastic portion 25, 26, i.e., the part most protruding in the third direction Z, to the other-end side Y2 in the second direction Y of the body portion 21, is almost equal to the length H1 in the second direction Y from the bottom surface 124 of the groove 12 to the first recess 14 in the power supply rail 1. Strictly, the length H10 is smaller than the length H1 by a length of the terminal portions 22, 23 of the power supply terminal 2 compressed in the second direction Y by elastic force when the power supply terminal 2 is inserted into the power supply rail 1.

Two elastic portions 25, 26 are provided so as to be separated from each other in the first direction X on the first side surface 211 of the power supply terminal 2. The elastic portions 25, 26 are formed by wire springs or plate springs, for example. In the drawings, an example in which the elastic portions 25, 26 are formed by wire springs, is shown. As a method for mounting the elastic portions 25, 26 to the depressed portion 213, for example, it is conceivable that the wire springs are inserted into holes or the like formed in the depressed portion 213. Therefore, the elastic portions 25, 26 can be easily mounted to the body portion 21.

A width W5 in the third direction Z to the top of each elastic portion 25, 26 including the body portion 21 of the power supply terminal 2 is slightly greater than a length obtained by adding the depth W3 of the first recess 14 or the depth W4 of the second recess 15 to the width W1 of the groove 12 of the power supply rail 1, so that elastic force in the third direction Z of the elastic portions 25, 26 is ensured to be great. When the elastic portions 25, 26 are elastically deformed in the third direction Z, the elastic portions 25, 26 are deformed to such an extent as to be stored in the depressed portion 213 of the body portion 21. The contact portion 27 is formed on the one-end side Y1 in the second direction Y of the body portion 21 so as to be electrically connected to the lead-wire portion 24. Power is supplied to the outside, using the contact portion 27.

Here, for facilitating the understanding of the configuration of the power supply rail system 100 of the present disclosure, a specific example of the sizes of the power supply terminal 2 will be described below. These specific sizes are an example in the case of being applied to the specific sizes of the power supply rail 1 shown above. Since the width W1 of the groove 12 of the power supply rail 1 shown above is about 3.4 mm, the width W2 in the third direction Z of the body portion 21 is about 3.1 mm. The width W5 in the third direction Z to the top of each elastic portion 25, 26 including the body portion 21 of the power supply terminal 2 is slightly greater than 4.4 mm.

The width W6 in the third direction Z of the hold portion 28 is about 6 mm, so as to have at least a size that allows a person to hold the hold portion 28 in working. Further, the hold portion 28 is formed in a size that makes it easy to take the power supply terminal 2 out of the groove 12 from a state in which the power supply terminal 2 is latched in the groove 12 by elastic force of the elastic portions 25, 26. The length T1 in the first direction X of the body portion 21 is about 50 mm. A length H6 in the second direction Y of the part where the elastic portions 25, 26 are formed, in the body portion 21, is about 17 mm.

A length T2 in the first direction X at the part where the elastic portions 25, 26 are not formed, in the body portion 21, is about 20 mm. A length H7 in the second direction Y at the part where the elastic portions 25, 26 are not formed, in the body portion 21, is about 18 mm. The size of the body portion 21 is set considering various viewpoints for forming the elastic portions 25, 26, inserting the body portion 21 into the groove 12 of the power supply rail 1, reducing an exposed part from the groove 12 of the power supply rail 1 as much as possible, decreasing the used material amount to reduce the cost, and the like.

As is understood from the dimensions of the power supply rail 1 and the power supply terminal 2 shown above, the power supply rail system 100 of the present disclosure can be installed at, for example, a joint-sized part such as a small gap of a fixture, the wall surface 3, the floor surface 7, the ceiling surface 8, or the like.

Next, the usage method for the power supply rail system 100 of the first embodiment configured as described above will be described. First, the power supply rail 1 is fixed and mounted to a necessary part. The mounting direction and position of the power supply rail 1 can be arbitrarily selected, and the power supply rail 1 only has to be fixed. Then, power is supplied from the outside to the conductive portion 13 of the power supply rail 1. Next, the body portion 21 of the power supply terminal 2 is inserted into a necessary part in the first direction X of the groove 12 of the power supply rail 1. At this time, formally, as shown in FIG. 7, with the hold portion 28 held, the body portion 21 is inserted while being pressed toward the other-end side Y2 in the second direction Y, such that the first side surface 211 of the power supply terminal 2 is opposed to the first side wall 121 of the groove 12 of the power supply rail 1. Specifically, the power supply terminal 2 in the state shown in FIG. 3 is inserted into the power supply rail 1 shown in FIG. 1.

As a result, elastic force of the elastic portions 25, 26 of the power supply terminal 2 is exerted in the third direction Z, so that the elastic portions 25, 26 are latched in contact with the inside of the first recess 14 formed on the first side wall 121 of the power supply rail 1. Then, the terminal portions 22, 23 of the power supply terminal 2 come into contact with the conductive portion 13 of the power supply rail 1. At the same time, the terminal portions 22, 23 are compressed with their elastic force in the second direction Y, so that the terminal portions 22, 23 are assuredly in contact with the conductive portion 13 of the power supply rail 1.

In this way, using elastic force of the elastic portions 25, 26 of the power supply terminal 2, the power supply terminal 2 can be mounted so as to be assuredly latched and retained in the groove 12 of the power supply rail 1. Therefore, the power supply terminal 2 does not easily come off the groove 12 of the power supply rail 1. In addition, in the case of taking off the power supply terminal 2 from the groove 12 of the power supply rail 1, the hold portion 28 is drawn toward the one-end side Y1 in the second direction Y by greater force than elastic force of the elastic portions 25, 26 of the power supply terminal 2.

The mounting position of the power supply terminal 2 is not limited to one location of the power supply rail 1. The power supply terminal 2 can be mounted by being freely inserted/extracted as described above at any position in the first direction X where the groove 12 is formed in the power supply rail 1, and is mounted as appropriate at a part where the external power is needed.

The example in which one power supply terminal 2 is used for one power supply rail 1 has been shown, but without limitation thereto, if there are a plurality of parts where power is needed, a plurality of power supply terminals 2 may be mounted and used at different parts in the first direction X in one power supply rail 1 (see FIG. 9 described later).

In contrast, the case of erroneously inserting the body portion 21 of the power supply terminal 2 into the groove 12 of the power supply rail 1 reversely in the first direction X, will be described. Specifically, the power supply terminal 2 in the state shown in FIG. 5 is inserted into the power supply rail 1 shown in FIG. 1. At this time, since the direction is different from the formal direction in the first direction X, as shown in FIG. 8, with the hold portion 28 held, the body portion 21 is inserted while being pressed toward the other-end side Y2 in the second direction Y, such that the first side surface 211 of the power supply terminal 2 is opposed to the second side wall 122 of the groove 12 of the power supply rail 1. Then, elastic force of the elastic portions 25, 26 of the power supply terminal 2 is exerted in the third direction Z, so that the elastic portions 25, 26 are latched in contact with the inside of the second recess 15 formed on the second side wall 122 of the power supply rail 1.

The second recess 15 is formed on the opening 123 side of the groove 12 relative to the first recess 14. Therefore, as compared to the case of FIG. 7, a part on the one-end side Y1 in the second direction Y of the body portion 21 of the power supply terminal 2 is exposed to the outside of the groove 12. In addition, the terminal portions 22, 23 of the power supply terminal 2 are separated from the conductive portion 13 of the power supply rail 1 and thus are at a position not contacting therewith. Thus, the terminal portions 22, 23 can be prevented from being connected to different polarity sides. In addition, since power is not supplied from the terminal portions 22, 23 of the body portion 21 of the power supply terminal 2, it is possible to easily recognize that the body portion 21 is inserted in an erroneous direction, and then it is possible to mount the power supply terminal 2 in the formal state shown above by drawing the hold portion 28 toward the one-end side Y1 in the second direction Y with greater force than elastic force of the elastic portions 25, 26 of the power supply terminal 2 and taking off the power supply terminal 2 from the groove 12 of the power supply rail 1.

In the first embodiment, the example in which two elastic portions 25, 26 are provided has been shown. However, without limitation thereto, if the length in the first direction X of the body portion 21 is small, one elastic portion may be provided, or if the length in the first direction X of the body portion 21 is great, three or more elastic portions may be provided. It is noted that, in the case of providing two elastic portions 25, 26 separated from each other in the first direction X, retention by elastic force as described above can be effectively ensured on both sides in the first direction X and thus displacement can be assuredly prevented.

Next, a specific usage method for the power supply rail system 100 will be described. As shown in FIG. 9, an example in which the power supply rails 1 are mounted to the wall surface 3, the floor surface 7, and the ceiling surface 8, will be described. First, the case of installing a shelf board 6 for displaying commodities to the wall surface 3 will be described. The shelf board 6 is provided with an illumination portion 62 formed by, for example, an LED and for lighting up commodities, a contact portion 61 for supplying power to the illumination portion 62, and support members 5 for supporting the shelf board 6. The wall surface 3 is provided with fixtures 4 for fixing the support members 5 of the shelf board 6. At this time, the power supply rail 1 is also mounted to the wall surface 3 in the present disclosure. At this time, as shown in FIG. 2, if the power supply rail 1 is mounted such that the wall surface 3 is in contact with the brims 125, 126 of the power supply rail 1, installation can be easily performed. The same also applies for the floor surface 7 and the ceiling surface 8 described below, and therefore similar description will be omitted as appropriate.

Then, the contact portion 27 of the power supply terminal 2 is connected to the contact portion 61 of the shelf board 6, to supply power to the illumination portion 62 of the shelf board 6 and light up the illumination portion 62. Thus, the fixtures 4 and the support members 5 for supporting the shelf board 6 support the loads of the shelf board 6 and the commodities placed on the shelf board 6. On the other hand, the power supply rail system 100 of the present disclosure need not support the loads of the shelf board 6 and the commodities placed on the shelf board 6, and only needs to have a withstand load substantially corresponding to the load of the power supply terminal 2 itself.

It is also conceivable that an illumination device 63 having a contact portion 64 is fixed to the wall surface 3. In this case, another power supply terminal 2 is mounted to the power supply rail 1 shown above, and the contact portion 27 of the power supply terminal 2 is connected to the contact portion 64 of the illumination device 63, to supply power to the illumination device 63 and light up the illumination device 63. Thus, since the illumination device 63 is fixed to the wall surface 3, the power supply rail system 100 of the present disclosure need not support the load of the illumination device 63, and only needs to have a withstand load substantially corresponding to the load of the power supply terminal 2 itself.

Next, the case where an illumination device 70 for illumination, formed by an LED, for example, is mounted on the floor surface 7, will be described. The illumination device 70 is provided with a contact portion 71 for supplying power. Then, the contact portion 27 of the power supply terminal 2 is connected to the contact portion 71 of the illumination device 70, to light up the illumination device 70. Thus, since the illumination device 70 is mounted on the floor surface 7, the power supply rail system 100 of the present disclosure need not support the load of the illumination device 70, and since the power supply rail system 100 is mounted on the floor surface 7, the power supply rail system 100 needs almost no withstand load.

Next, the case where an illumination device 80 for illumination, formed by an LED, for example, is mounted on the ceiling surface 8, will be described. The illumination device 80 is fixed to the ceiling surface 8 in advance. The illumination device 80 is provided with a contact portion 81 for supplying power. Then, the contact portion 27 of the power supply terminal 2 is connected to the contact portion 81 of the illumination device 80, to light up the illumination device 80. Thus, since the illumination device 80 is fixed to the ceiling surface 8, the power supply rail system 100 of the present disclosure need not support the load of the illumination device 80, and only needs to have a withstand load substantially corresponding to the load of the power supply terminal 2 itself.

The illumination portion or the illumination device has been shown as an example to be supplied with external power using the power supply rail system 100 of the present disclosure. However, without limitation thereto, any part that needs to be supplied with power from another power source may be used as appropriate.

Since the power supply rail system 100 of the present disclosure can be used as described above, the load of only the body portion 21 of the power supply terminal 2 in the groove 12 of the power supply rail 1 can be easily supported by elastic force of the elastic portions 25, 26 of the power supply terminal 2. Thus, the groove 12 of the power supply rail 1 in an extremely small size can be used, and therefore other objects are not obstructed and the outer appearances of other structures are not impaired.

In the first embodiment, the example in which the power supply rail systems 100 are used by mounting the power supply rails 1 to the wall surface 3 formed vertically and the floor surface 7 and the ceiling surface 8 formed horizontally, has been shown. However, without limitation thereto, for example, the wall surface, the ceiling surface, or the floor surface is not necessarily limited to the one formed vertically or horizontally. Even for a wall surface, a ceiling surface, or a floor surface that is inclined, the power supply rail system 100 can be used in the same manner by fixing and mounting the power supply rail 1 along the inclination of the wall surface, the ceiling surface, or the floor surface.

The power supply rail system of the first embodiment configured as described above includes a power supply rail and a power supply terminal attachable/detachable to/from the power supply rail.

The power supply rail includes an insulating base portion, a groove formed so as to extend in a first direction in the base portion and to have an opening on a one-end side in a second direction perpendicular to the first direction, a conductive portion to be electrically connected to an outside, the conductive portion being provided at a bottom surface on an other-end side in the second direction of the groove, and a first recess provided on a first side wall which is one of side walls of the groove so as to extend in the first direction and to be depressed in a third direction perpendicular to the first direction and the second direction.

The power supply terminal is attachable/detachable into/from the groove of the power supply rail, and includes a body portion to be inserted into the groove of the power supply rail, a terminal portion to be electrically connected to the conductive portion, the terminal portion being formed on the other-end side in the second direction of the body portion, a lead-wire portion electrically connected to the terminal portion and led to the one-end side in the second direction of the body portion, and an elastic portion provided on a first side surface of the body portion on a side opposed to the first side wall of the groove, the elastic portion having elastic force in the third direction.

When the power supply terminal is inserted such that the first side surface of the power supply terminal is opposed to the first side wall of the groove, the elastic portion of the power supply terminal is latched in contact with an inside of the first recess of the power supply rail by the elastic force of the elastic portion, and the terminal portion of the power supply terminal comes into contact with the conductive portion of the power supply rail.

Thus, attachment and detachment can be easily performed and electric connection is stabilized.

The mounting position of the power supply terminal is not limited to one location of the power supply rail, and the power supply terminal can be mounted by being freely inserted/extracted at any position in the first direction where the groove is formed in the power supply rail, and is mounted as appropriate at a part where the external power is needed.

Further, the power supply rail includes a second recess provided on a second side wall which is another one of the side walls of the groove, so as to extend in the first direction and to be depressed in the third direction, a formation position of the second recess is on the one-end side in the second direction of the groove relative to a formation position of the first recess, and when the power supply terminal is inserted such that the first side surface of the power supply terminal is opposed to the second side wall of the groove, the elastic portion of the power supply terminal is latched in contact with an inside of the second recess of the power supply rail by the elastic force of the elastic portion, and the terminal portion of the power supply terminal is separated from the conductive portion of the power supply rail.

Thus, erroneous insertion of the power supply terminal can be prevented.

Further, the power supply terminal includes a plurality of the elastic portions provided so as to be separated from each other in the first direction on the first side surface of the power supply terminal.

Thus, the power supply terminal can be stably mounted to the groove of the power supply rail.

Further, the elastic portion of the power supply terminal is formed by a wire spring or a plate spring, and the terminal portion of the power supply terminal is formed by a spring electrode.

Thus, elastic force of the power supply terminal and the terminal portion can be easily obtained.

Further, a length in the second direction of the body portion of the power supply terminal is greater than a length in the second direction of the groove of the power supply rail, and the power supply terminal has, on the one-end side in the second direction of the body portion, a hold portion formed such that a width in the third direction on the one-end side in the second direction of the body portion of the power supply terminal is greater than a width in the third direction of the opening of the groove.

Thus, attachment and detachment of the power supply terminal can be more easily performed.

Further, a contact portion electrically connected to the lead-wire portion is provided on the one-end side in the second direction of the body portion.

Thus, power can be easily supplied to the outside.

Further, the power supply rail is mounted to at least one of a ceiling surface, a wall surface, or a floor surface.

Thus, it is possible to easily ensure a power supply on at least one of the ceiling surface, the wall surface, or the floor surface.

Further, a length in the first direction of the groove of the power supply rail is greater than a length in the first direction of the body portion of the power supply terminal, so that a plurality of the power supply terminals are attachable/detachable in the first direction of the groove of the power supply rail.

Thus, a plurality of the power supply terminals can be attached/detached to/from the groove of the power supply rail.

Second Embodiment

In the first embodiment, a simple structure example for the contact portion 27 of the power supply terminal 2 has been shown. However, without limitation thereto, other examples will be described with reference to FIG. 10 to FIG. 12. The structures other than the contact portion 27 are the same as in the first embodiment and therefore the description thereof is omitted as appropriate.

Figure 10:
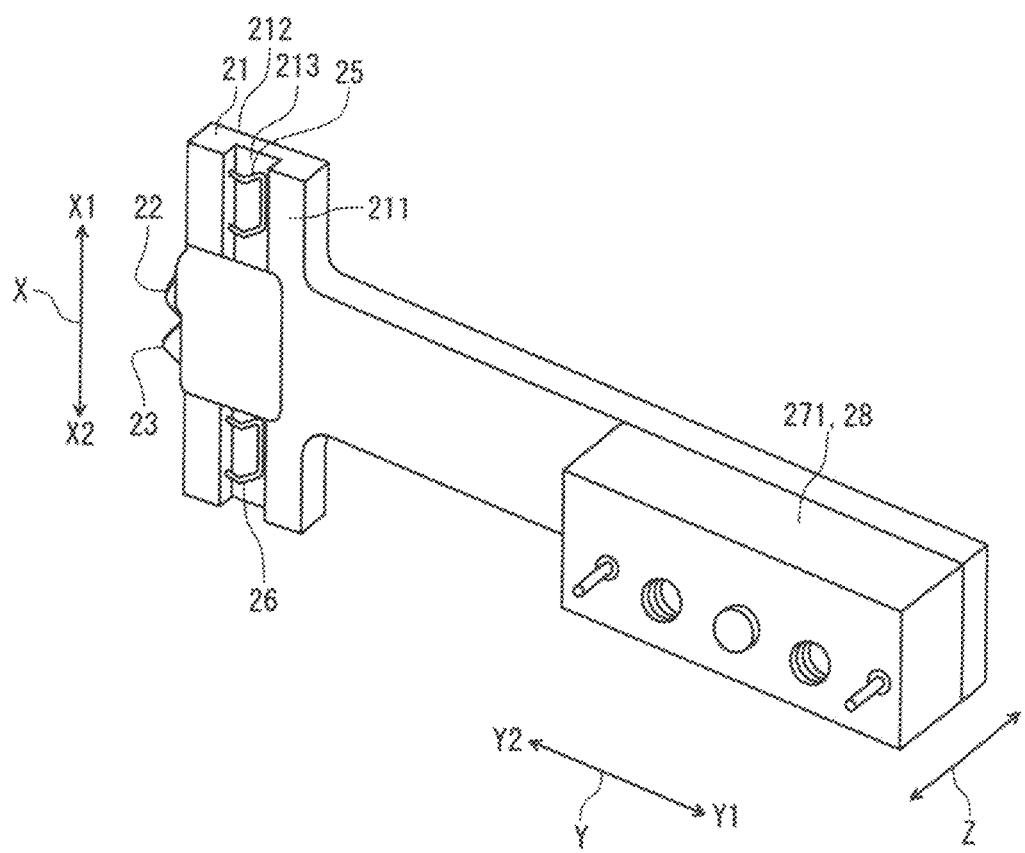
FIG. 10 is a perspective view showing a structure of a power supply terminal of a power supply rail system according to the second embodiment of the present disclosure.

First, as shown in FIG. 10, the body portion 21 of the power supply terminal 2 is elongated toward the one-end side Y1 in the second direction Y, to form a contact portion 271 having a width in the third direction Z. The contact portion 271 also has a function as the hold portion 28.

Figure 11:
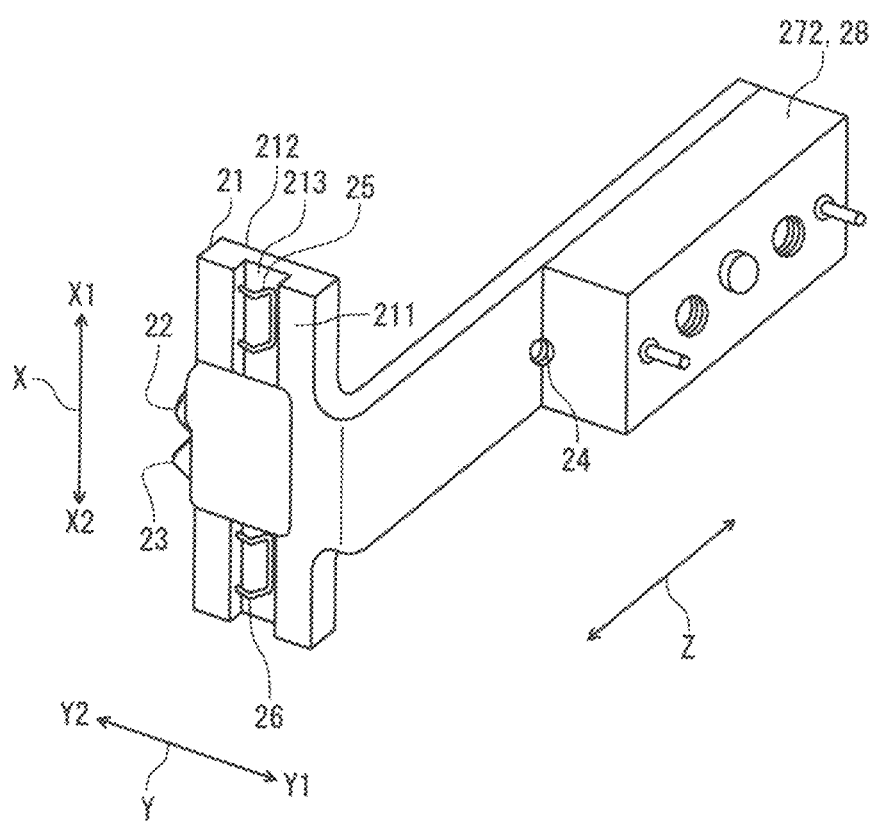
FIG. 11 is a perspective view showing another structure of the power supply terminal of the power supply rail system according to the second embodiment.
Figure 12:
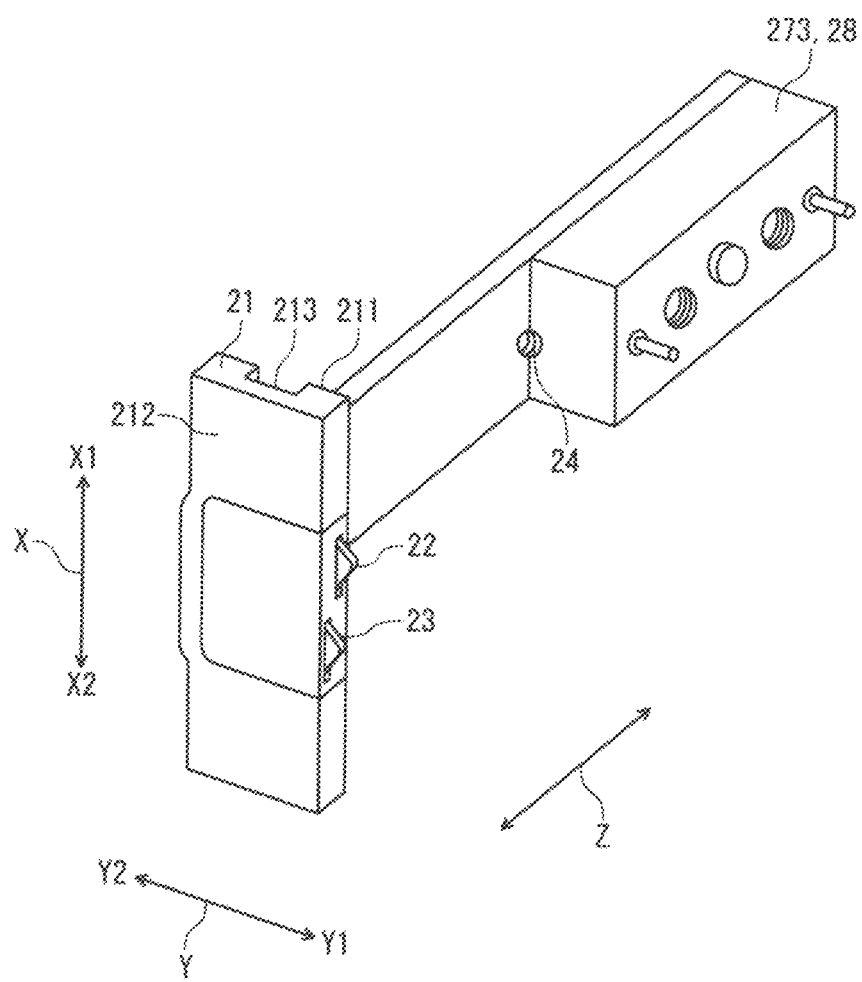
FIG. 12 is a perspective view showing another structure of the power supply terminal of the power supply rail system according to the second embodiment.

Alternatively, as shown in FIG. 11, a part of the body portion 21 of the power supply terminal 2 on the one-end side Y1 in the second direction Y is bent in the third direction Z, to form a contact portion 272. Still alternatively, as shown in FIG. 12, a part of the body portion 21 of the power supply terminal 2 on the one-end side Y1 in the second direction Y is bent toward a side different from the side in FIG. 11 in the third direction Z, to form a contact portion 273. The contact portions 272, 273 also have a function as the hold portion 28.

Thus, the contact portions 271, 272, 273 can be formed with their directions or the like changed as appropriate in accordance with an external contact part, and thereby can adapt to various external structures. In addition, it should be understood that a part having a contact portion corresponding to the shape of any of the contact portions 271, 272, 273 is applicable in the same manner as in FIG. 9. The shapes and the directions of the contact portions are not limited to the above ones, and the contact portions may be formed with various shapes and directions.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 power supply rail
100 power supply rail system
11 base portion
12 groove
121 first side wall
122 second side wall
123 opening
124 bottom surface
125 brim
126 brim
13 conductive portion
14 first recess
15 second recess
2 power supply terminal
21 body portion
211 first side surface
212 second side surface
213 depressed portion
22 terminal portion
23 terminal portion
24 lead-wire portion
25 elastic portion
26 elastic portion
27 contact portion
271 contact portion
272 contact portion
273 contact portion
28 hold portion
3 wall surface
4 fixture
5 support member
6 shelf board
61 contact portion
62 illumination portion
63 illumination device
64 contact portion
7 floor surface
70 illumination device
71 contact portion
8 ceiling surface
80 illumination device
81 contact portion
X first direction
X1 one-end side
X2 other-end side
Y second direction
Y1 one-end side
Y2 other-end side
Z third direction
H1 length
H2 length
H3 length
H4 length
H5 length
H6 length
H7 length
H4 length
T1 length
T2 length
TX length
W1 width
W2 width
W3 depth
W4 depth
W5 width

What is claimed is:

1. A power supply rail system comprising:
a power supply rail; and
a power supply terminal attachable/detachable to/from the power supply rail, wherein the power supply rail includes
an insulating base portion,
a groove formed so as to extend in a first direction in the base portion and to have an opening on a one-end side in a second direction perpendicular to the first direction,
a conductive portion to be electrically connected to an outside, the conductive portion being provided at a bottom surface on an other-end side in the second direction of the groove, and
a first recess provided on a first side wall which is one of side walls of the groove so as to extend in the first direction and to be depressed in a third direction perpendicular to the first direction and the second direction, the power supply terminal is attachable/detachable into/from the groove of the power supply rail, the power supply terminal includes
- a body portion to be inserted into the groove of the power supply rail,
- a terminal portion to be electrically connected to the conductive portion, the terminal portion being formed on an other-end side in a second direction of the body portion,
- a lead-wire portion electrically connected to the terminal portion and led to a one-end side in the second direction of the body portion, and
- an elastic portion provided on a first side surface of the body portion on a side opposed to the first side wall of the groove, the elastic portion having elastic force in a third direction of the body portion, and when the power supply terminal is inserted such that the first side surface of the power supply terminal is opposed to the first side wall of the groove, the elastic portion of the power supply terminal is latched in contact with an inside of the first recess of the power supply rail by the elastic force of the elastic portion, and the terminal portion of the power supply terminal comes into contact with the conductive portion of the power supply rail.

2. The power supply rail system according to claim 1, wherein
the power supply rail includes a second recess provided on a second side wall which is another one of the side walls of the groove, so as to extend in the first direction and to be depressed in the third direction,
a formation position of the second recess is on the one-end side in the second direction of the groove relative to a formation position of the first recess, and
when the power supply terminal is inserted such that the first side surface of the power supply terminal is opposed to the second side wall of the groove, the elastic portion of the power supply terminal is latched in contact with an inside of the second recess of the power supply rail by the elastic force of the elastic portion, and the terminal portion of the power supply terminal is separated from the conductive portion of the power supply rail.

3. The power supply rail system according to claim 1, wherein
the power supply terminal includes a plurality of elastic portions provided so as to be separated from each other in the first direction on the first side surface of the power supply terminal.

4. The power supply rail system according to claim 2, wherein
the power supply terminal includes a plurality of elastic portions provided so as to be separated from each other in the first direction on the first side surface of the power supply terminal.

5. The power supply rail system according to claim 1, wherein
the elastic portion of the power supply terminal is formed by a wire spring or a plate spring, and
the terminal portion of the power supply terminal is formed by a spring electrode.

6. The power supply rail system according to claim 2, wherein
the elastic portion of the power supply terminal is formed by a wire spring or a plate spring, and
the terminal portion of the power supply terminal is formed by a spring electrode.

7. The power supply rail system according to claim 3, wherein
each of the elastic portions of the power supply terminal is formed by a wire spring or a plate spring, and
the terminal portion of the power supply terminal is formed by a spring electrode.

8. The power supply rail system according to claim 4, wherein
each of the elastic portions of the power supply terminal is formed by a wire spring or a plate spring, and
the terminal portion of the power supply terminal is formed by a spring electrode.

9. The power supply rail system according to claim 1, wherein
a length in the second direction of the body portion of the power supply terminal is greater than a length in the second direction of the groove of the power supply rail, and
the power supply terminal has, on the one-end side in the second direction of the body portion, a hold portion formed such that a width in the third direction on the one-end side in the second direction of the body portion of the power supply terminal is greater than a width in the third direction of the opening of the groove.

10. The power supply rail system according to claim 2, wherein
a length in the second direction of the body portion of the power supply terminal is greater than a length in the second direction of the groove of the power supply rail, and
the power supply terminal has, on the one-end side in the second direction of the body portion, a hold portion formed such that a width in the third direction on the one-end side in the second direction of the body portion of the power supply terminal is greater than a width in the third direction of the opening of the groove.

11. The power supply rail system according to claim 3, wherein
a length in the second direction of the body portion of the power supply terminal is greater than a length in the second direction of the groove of the power supply rail, and
the power supply terminal has, on the one-end side in the second direction of the body portion, a hold portion formed such that a width in the third direction on the one-end side in the second direction of the body portion of the power supply terminal is greater than a width in the third direction of the opening of the groove.

12. The power supply rail system according to claim 4, wherein
a length in the second direction of the body portion of the power supply terminal is greater than a length in the second direction of the groove of the power supply rail, and
the power supply terminal has, on the one-end side in the second direction of the body portion, a hold portion formed such that a width in the third direction on the one-end side in the second direction of the body portion of the power supply terminal is greater than a width in the third direction of the opening of the groove.

13. The power supply rail system according to claim 5, wherein a length in the second direction of the body portion of the power supply terminal is greater than a length in the second direction of the groove of the power supply rail, and the power supply terminal has, on the one-end side in the second direction of the body portion, a hold portion formed such that a width in the third direction on the one-end side in the second direction of the body portion of the power supply terminal is greater than a width in the third direction of the opening of the groove.

14. The power supply rail system according to claim 6, wherein a length in the second direction of the body portion of the power supply terminal is greater than a length in the second direction of the groove of the power supply rail, and the power supply terminal has, on the one-end side in the second direction of the body portion, a hold portion formed such that a width in the third direction on the one-end side in the second direction of the body portion of the power supply terminal is greater than a width in the third direction of the opening of the groove.

15. The power supply rail system according to claim 1, wherein a contact portion electrically connected to the lead-wire portion is provided on the one-end side in the second direction of the body portion.

16. The power supply rail system according to claim 2, wherein a contact portion electrically connected to the lead-wire portion is provided on the one-end side in the second direction of the body portion.

17. The power supply rail system according to claim 1, wherein the power supply rail is mounted to at least one of a ceiling surface, a wall surface, or a floor surface.

18. The power supply rail system according to claim 2, wherein the power supply rail is mounted to at least one of a ceiling surface, a wall surface, or a floor surface.

19. The power supply rail system according to claim 1, wherein a length in the first direction of the groove of the power supply rail is greater than a length in a first direction of the body portion of the power supply terminal, so that a plurality of the power supply terminals are attachable/detachable in the first direction of the groove of the power supply rail.

20. The power supply rail system according to claim 2, wherein a length in the first direction of the groove of the power supply rail is greater than a length in a first direction of the body portion of the power supply terminal, so that a plurality of the power supply terminals are attachable/detachable in the first direction of the groove of the power supply rail.

* * * * *